(12) United States Patent
Yoshitomo et al.

(10) Patent No.: US 9,806,504 B2
(45) Date of Patent: Oct. 31, 2017

(54) GAS CIRCUIT BREAKER AND METHOD FOR ATTACHING BUSHING

(71) Applicant: MITSUBISHI ELECTRIC CORPORATION, Chiyoda-ku, Tokyo (JP)

(72) Inventors: Yuji Yoshitomo, Tokyo (JP); Daisuke Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/035,180

(22) PCT Filed: Jan. 27, 2014

(86) PCT No.: PCT/JP2014/051671
§ 371 (c)(1),
(2) Date: May 6, 2016

(87) PCT Pub. No.: WO2015/111217
PCT Pub. Date: Jul. 30, 2015

(65) Prior Publication Data
US 2016/0294167 A1    Oct. 6, 2016

(51) Int. Cl.
*H02B 13/035* (2006.01)
*H01H 33/56* (2006.01)
(Continued)

(52) U.S. Cl.
CPC ....... *H02B 13/0358* (2013.01); *H01H 33/025* (2013.01); *H01H 33/027* (2013.01);
(Continued)

(58) Field of Classification Search
CPC .... H01H 33/025; H01H 33/027; H01H 33/56; H01H 33/64; H01H 69/00; H01H 9/30; H02B 13/0358
(Continued)

(56) References Cited

U.S. PATENT DOCUMENTS 6,291,786 B1 * 9/2001 Gericke ............... H01H 33/027
174/142
6,307,172 B1 * 10/2001 Bolin ..................... H01H 33/56
218/155
(Continued)

FOREIGN PATENT DOCUMENTS

JP    50-28395 U    8/1975
JP    55-132921 U    3/1979
(Continued)

OTHER PUBLICATIONS

International Search Report (PCT/ISA/210) dated Feb. 25, 2014 by the Japanese Patent Office as the International Searching Authority for International Application No. PCT/JP2014/051671.
(Continued)

*Primary Examiner* — Renee Luebke
*Assistant Examiner* — William Bolton
(74) *Attorney, Agent, or Firm* — Buchanan Ingersoll & Rooney PC

(57) ABSTRACT

An adapter with an insertion guide for connection between a porcelain tube and a branch tube is provided at an upper end portion of the branch tube. The adapter with the insertion guide includes an insertion guide portion extending in an axial direction of the branch tube. After inserting a lower end of a central conductor into an insertion portion of an arc-extinguishing chamber, a flange of the porcelain tube is inserted into the adapter with the insertion guide by guidance of the insertion guide portion. Accordingly, in a state (Continued)

where a bushing and the branch tube are self-aligned with each other, a lower end portion of the central conductor is inserted into the insertion portion.

6 Claims, 4 Drawing Sheets

(51) Int. Cl.
    *H01H 33/64*     (2006.01)
    *H01H 69/00*     (2006.01)
    *H01H 33/02*     (2006.01)

(52) U.S. Cl.
    CPC ............ *H01H 33/56* (2013.01); *H01H 33/64* (2013.01); *H01H 69/00* (2013.01)

(58) Field of Classification Search
    USPC .................. 218/156, 13, 55–57, 59, 61, 155
    See application file for complete search history.

(56) References Cited

U.S. PATENT DOCUMENTS

| | | | |
|---|---|---|---|
| 6,410,867 B1* | 6/2002 | Meyer | H02B 13/045 |
| | | | 200/49 |
| 2001/0022235 A1* | 9/2001 | Villa | H01B 17/26 |
| | | | 174/167 |
| 2007/0119818 A1 | 5/2007 | Meinherz | |
| 2010/0288733 A1 | 11/2010 | Ichikawa et al. | |
| 2012/0103941 A1* | 5/2012 | Nakayama | H02B 13/0356 |
| | | | 218/134 |
| 2012/0160810 A1* | 6/2012 | Ohtsuka | H02B 13/0354 |
| | | | 218/140 |
| 2013/0213937 A1* | 8/2013 | Yoshida | H01H 33/662 |
| | | | 218/90 |

FOREIGN PATENT DOCUMENTS

| | | |
|---|---|---|
| JP | 57-31308 A | 2/1982 |
| JP | 59-30610 U | 2/1984 |
| JP | 01-108921 U | 7/1989 |
| JP | 02-4964 B2 | 1/1990 |
| JP | 02-25141 U | 2/1990 |
| JP | 06-11229 U | 2/1994 |
| JP | 06-031031 U | 4/1994 |
| JP | 07-16512 U | 3/1995 |
| JP | 07-033307 Y2 | 7/1995 |
| JP | 08-273462 A | 10/1996 |
| JP | 2007-306701 A | 10/1996 |
| JP | 09-102251 A | 4/1997 |
| JP | 09-320404 A | 12/1997 |
| JP | 09-330627 A | 12/1997 |
| JP | 10-014031 A | 1/1998 |
| JP | 10-271650 A | 10/1998 |
| JP | 2000-030948 A | 1/2000 |
| JP | 2000-92635 A | 3/2000 |
| JP | 2003-109447 A | 4/2003 |
| JP | 2007-520184 A | 7/2007 |

OTHER PUBLICATIONS

Written Opinion (PCT/ISA/237) dated Feb. 25, 2014, by the Japanese Patent Office as the International Searching Authority for International Application No. PCT/JP2014/051671.

\* cited by examiner

GAS CIRCUIT BREAKER AND METHOD FOR ATTACHING BUSHING

FIELD

The present invention relates to a gas circuit breaker including a bushing and a method for attaching a bushing to the gas circuit breaker.

BACKGROUND

A bushing is configured by a central conductor penetrating through the inside of a porcelain tube made of, for example, porcelain or polymer (for example, see Patent Literature 1).

Further, in a gas circuit breaker to which a bushing is connected, an end portion of the central conductor is inserted into an insertion portion provided in an arc-extinguishing chamber in a circuit breaker tank, and the bushing is thus electrically connected to the gas circuit breaker.

CITATION LIST

Patent Literature

Patent Literature 1: Japanese Patent Application Laid-Open No. H9-320404

SUMMARY

Technical Problem

However, with conventional gas circuit breakers, when attaching the bushing to the arc-extinguishing chamber, if the bushing is inserted such that it deviates from the normal angle, for example, there is a risk of the central conductor seizing in the insertion portion.

That is, with a conventional structure for attaching the bushing, because the angle adjustment of the bushing when attaching the bushing to the arc-extinguishing chamber depends on a visual inspection by an assembly worker, when the inclination angle of the bushing deviates from the normal angle, the end portion of the central conductor may run over the insertion portion without being inserted into the insertion portion, or may be seized during insertion even though it is inserted into the insertion portion, and thus, the workability is very poor.

The present invention has been made in view of the above, and an object thereof is to provide a gas circuit breaker and a method for attaching a bushing in which the attachment of the bushing is easy and the assembling workability is improved.

Solution to Problem

In order to solve the above problems and achieve the object, a gas circuit breaker according to an aspect of the present invention is a gas circuit breaker including: an arc-extinguishing chamber that is housed in a circuit breaker tank disposed such that an axis is parallel to an installation surface and that includes an insertion portion for attaching a bushing; a bushing that includes a porcelain tube and a central conductor, the porcelain tube being connected to a branch tube branched from an upper side surface of the circuit breaker tank and including a flange at a lower end portion, the central conductor penetrating through an inside of the porcelain tube and having a lower end portion inserted through the branch tube into the insertion portion; and an adapter with an insertion guide that is provided at a leading end portion of the branch tube for connection between the porcelain tube and the branch tube, and that includes an insertion guide portion extending in an axial direction of the branch tube, the flange being inserted into the adapter with the insertion guide, wherein, after a lower end of the central conductor is inserted into the insertion portion, the flange is inserted into the adapter with the insertion guide in accordance with guidance of the insertion guide portion such that the bushing and the branch tube are self-aligned with each other.

Advantageous Effects of Invention

According to the present invention, an effect in which the attachment of the bushing is easy and the assembling workability is improved is achieved.

DESCRIPTION OF EMBODIMENTS

A gas circuit breaker and a method for attaching a bushing according to an embodiment of the present invention will be described below in detail with reference to the drawings. The present invention is not limited by the embodiment.

Embodiment

Figure 1:
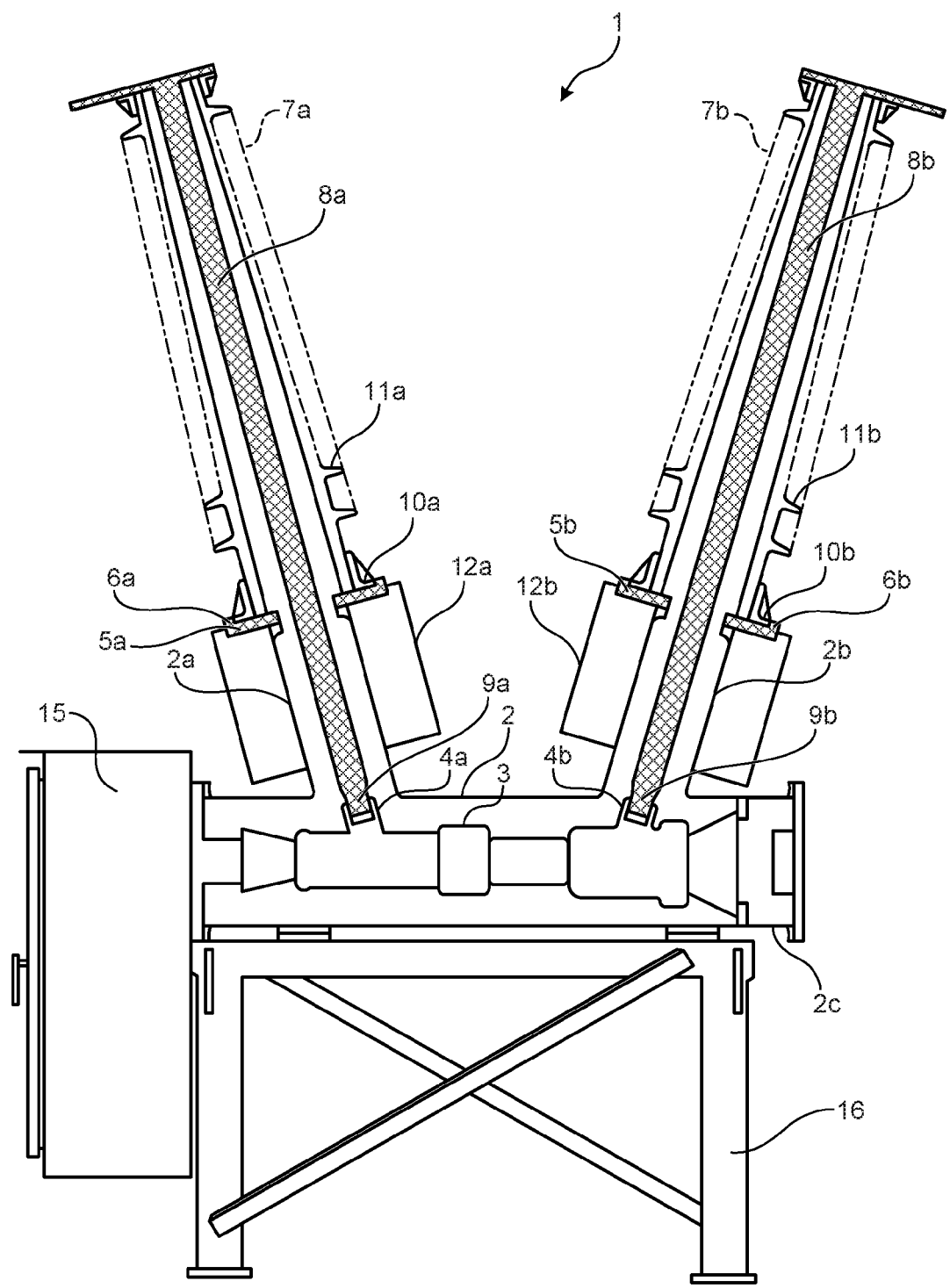
FIG. 1 is a cross-sectional view illustrating a configuration of a gas circuit breaker according to an embodiment.
Figure 2:
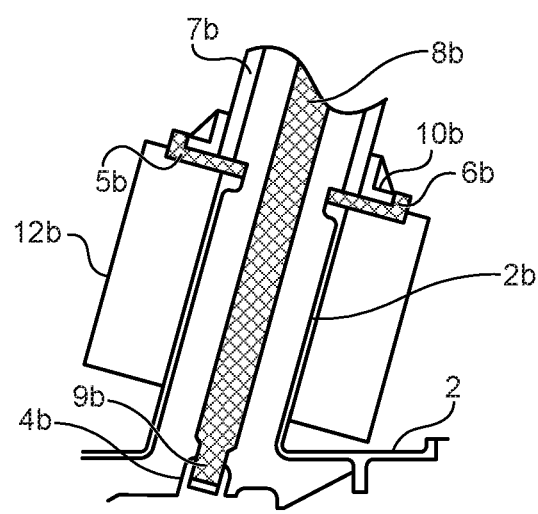
FIG. 2 is a partially enlarged view of FIG. 1.

FIG. 1 is a cross-sectional view illustrating a configuration of a gas circuit breaker according to the present embodiment. FIG. 2 is a partially enlarged view of FIG. 1, and in particular, illustrates the attaching structure of a bushing 7b. The attaching structure of a bushing 7a is also the same as that in FIG. 2.

A gas circuit breaker 1, which is a power switching device, includes a main body in which an arc-extinguishing chamber 3 is housed in a circuit breaker tank 2, and the bushings 7a and 7b connected to the main body. The gas circuit breaker 1, for example, illustrates a configuration of one of the three phases.

The circuit breaker tank 2 is made of a cylindrical metal tank and is disposed such that its axis is parallel to the installation surface. That is, the gas circuit breaker 1 is a so-called horizontal circuit breaker. The insulating gas is sealed in the circuit breaker tank 2. Further, an operating device 15 of the gas circuit breaker 1 is disposed at an axial one end of the circuit breaker tank 2. In addition, an end portion 2c of the circuit breaker tank 2 is an opening for visual inspection in a state where a cover plate is detached when attaching the bushings 7a and 7b. Further, the circuit breaker tank 2 is mounted on a frame 16.

Branch tubes 2a and 2b are provided on the upper side surface of the main tube of the circuit breaker tank 2 and are separated from each other in the axial direction. The branch tubes 2a and 2b are drawn out of the main tube by a certain length, and, for example, are inclined in a direction away from each other.

A fixed contactor and a movable contactor (not illustrated) are disposed in the arc-extinguishing chamber 3. The movable contactor is disposed on the bushing 7a side and the fixed contactor is disposed on the bushing 7b side. The arc generated between the movable contactor and the fixed contactor at the time of opening and closing is extinguished in the arc-extinguishing chamber 3. Insertion portions 4a and 4b for attaching the bushings 7a and 7b are provided in the arc-extinguishing chamber 3. Each of the insertion portions 4a and 4b, for example, is made up of a contact folder. Each of the lower end portions of central conductors 8a and 8b is formed in a contact shape, and is adapted to be inserted into the insertion portion 4a and 4b by sliding contact. The opening directions of the insertion portions 4a and 4b are axial directions of the branch tubes 2a and 2b, respectively, and determine the inclination angles of the bushings 7a and 7b. That is, after the bushings 7a and 7b are attached, the axial directions of the branch tubes 2a and 2b, the axial directions of the central conductors 8a and 8b, and the axial directions of porcelain tubes 11a and 11b coincide with one another. The branch tubes 2a and 2b are provided in accordance with the positions of the insertion portions 4a and 4b, respectively.

The bushing 7a is a bushing disposed on the movable contactor side and is configured such that the central conductor 8a extends inside the cylindrical porcelain tube 11a provided with a plurality of pleats on an outer circumferential surface. The porcelain tube 11a is, for example, a ceramic porcelain tube or a polymer porcelain tube. The insulating gas is sealed in the porcelain tube 11a.

The central conductor 8a extends along the axis of the porcelain tube 11a and is inclined at the same angle as the inclination angle of the bushing 7a. The upper end of the central conductor 8a extends to the upper end of the porcelain tube 11a, and the upper end portion of the central conductor 8a is connected to a power cable (not illustrated) or the like. The length of the central conductor 8a is longer than the length of the porcelain tube 11a, the central conductor 8a penetrates through the porcelain tube 11a, and a lower end portion 9a of the central conductor 8a is inserted through the branch tube 2a into the insertion portion 4a in a state of extending a constant distance from the lower end of the porcelain tube 11a.

A flange 10a is provided at the lower end portion of the porcelain tube 11a. The flange 10a is provided in a flange shape on the outer circumferential surface of the lower end portion of the porcelain tube 11a over the entire circumference in the circumferential direction, and for example, has an annular shape.

On the outer circumference of the leading end portion (the upper end portion) of the branch tube 2a, an adapter with an insertion guide 5a for connecting the porcelain tube 11a and the branch tube 2a is provided. Specifically, the adapter with the insertion guide 5a includes, for example, an annular plate-shaped base portion having an upper end surface abutting against the lower end surface of the porcelain tube 11a and the lower end surface of the flange 10a, and an insertion guide portion 6a that is erected on the upper end surface of the base portion. The insertion guide portion 6a has a cylindrical shape corresponding to the shape of the flange 10a and guides the flange 10a when inserting the flange 10a into the adapter with the insertion guide 5a. The base portion of the adapter with the insertion guide 5a is disposed so as to be orthogonal to the axial direction of the branch tube 2a. The insertion guide portion 6a extends in the axial direction of the branch tube 2a toward the opposite side of the branch tube 2a. The inner diameter of the lower end of the porcelain tube 11a is, for example, larger than the outer diameter of the upper end of the branch tube 2a. The inner diameter of the insertion guide portion 6a is slightly larger than the outer diameter of the flange 10a, and the flange 10a is inserted so as to be fitted into the adapter with the insertion guide 5a.

Further, a device current transformer 12a is provided on the outer circumference of the branch tube 2a. The device current transformer 12a includes a device (not illustrated) for measuring the current flowing through the central conductor 8a, in a cylindrical device current transformer tank.

The bushing 7b is a bushing disposed on the movable contactor side and is configured such that the central conductor 8b extends inside the cylindrical porcelain tube 11b provided with a plurality of pleats on the outer circumferential surface. The porcelain tube 11b is, for example, a ceramic porcelain tube or a polymer porcelain tube. The insulating gas is sealed in the porcelain tube 11b.

The central conductor 8b extends along the axis of the porcelain tube 11b and is inclined at the same angle as the inclination angle of the bushing 7b. The upper end of the central conductor 8b extends to the upper end of the porcelain tube 11b, and the upper end portion of the central conductor 8b is connected to a power cable (not illustrated) or the like. The length of the central conductor 8b is longer than the length of the porcelain tube 11b, the central conductor 8b penetrates through the porcelain tube 11b, and a lower end portion 9b of the central conductor 8b is inserted through the branch tube 2b into the insertion portion 4b in a state of extending a constant distance from the lower end of the porcelain tube 11b.

A flange 10b is provided at the lower end portion of the porcelain tube 11b. The flange 10b is provided in a flange shape on the outer circumferential surface of the lower end portion of the porcelain tube 11b over the entire circumference in the circumferential direction, and for example, has an annular shape.

On the outer circumference of the leading end portion (the upper end portion) of the branch tube 2b, an adapter with an insertion guide 5b for connecting the porcelain tube 11b and the branch tube 2b is provided. Specifically, the adapter with the insertion guide 5b includes, for example, an annular plate-shaped base portion having an upper end surface abutting against the lower end surface of the porcelain tube 11b and the lower end surface of the flange 10b, and an insertion guide portion 6b that is erected on the upper end surface of the base portion. The insertion guide portion 6b has a cylindrical shape corresponding to the shape of the flange 10b and guides the flange 10b when inserting the flange 10b into the adapter with the insertion guide 5b. The base portion of the adapter with the insertion guide 5b is disposed so as to be orthogonal to the axial direction of the branch tube 2b. The insertion guide portion 6b extends in the axial direction of the branch tube 2b toward the opposite side of the branch tube 2b. The inner diameter of the lower end of the porcelain tube 11b is, for example, larger than the outer diameter of the upper end of the branch tube 2b. The inner diameter of the insertion guide portion 6b is slightly larger than the outer diameter of the flange 10b, and the flange 10b is inserted so as to be fitted into the adapter with the insertion guide 5b.

Further, a device current transformer 12b is provided on the outer circumference of the branch tube 2b. The device current transformer 12b includes a device (not illustrated)

for measuring the current flowing through the central conductor 8b, in a cylindrical device current transformer tank.

Figure 3:
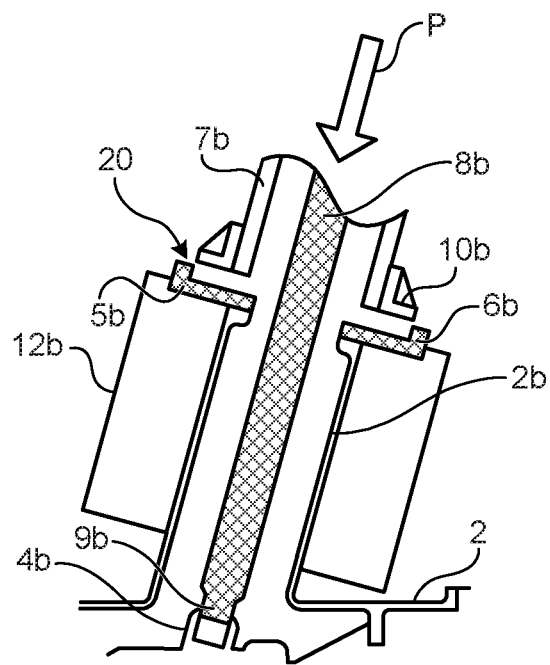
FIG. 3(a) and FIG. 3(b) are diagrams for explaining a method for attaching a bushing according to the embodiment.
Figure 3:
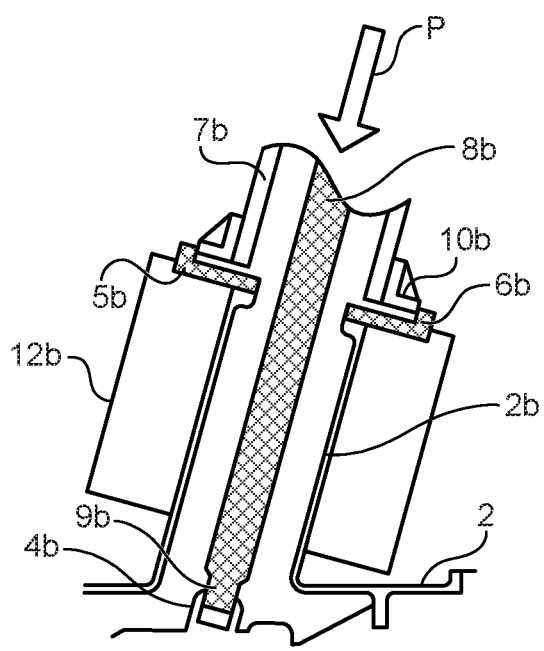

Next, a method for attaching the bushing according to the present embodiment will be described with reference to FIG. 3. FIG. 3 is a diagram for explaining the method for attaching the bushing according to the present embodiment, and specifically, illustrates a method for attaching the bushing 7b. The method for attaching the bushing 7a is the same.

First, the bushing 7b is inclined to be substantially parallel to the axial direction of the branch tube 2b and is moved in the direction of arrow P, and the lower end (the leading end) of the central conductor 8b is inserted through the branch tube 2b into the insertion portion 4b (FIG. 3(a)).

At this point in time, a gap 20 is kept between the flange 10b and the adapter with the insertion guide 5b in a state where the lower end of the central conductor 8b is inserted into the insertion portion 4b. Here, the height of the insertion guide portion 6b is set such that, at least when the lower end of the central conductor 8b coincides with the upper end of the insertion portion 4b in the axial direction, an axial gap is provided between the upper end of the insertion guide portion 6b and the lower end of and the flange 10b. Further, the axial direction of this case is an axial direction of the adapter with the insertion guide 5b, is the same as the axial direction of the branch tube 2b, and is the same as the opening direction of the insertion portion 4b. In this state, the lower end portion 9b of the central conductor 8b is not completely inserted into the insertion portion 4b.

Subsequently, by inserting the flange 10b into the adapter with the insertion guide 5b in accordance with the guidance of the insertion guide portion 6b, the lower end portion 9b of the central conductor 8b is further inserted into the insertion portion 4b (FIG. 3(b)). In this way, the bushing 7b and the branch tube 2b are self-aligned, which makes it possible to insert the central conductor 8b into the insertion portion 4b in a state where the bushing 7b is inclined at the normal angle. In this case, because there is the gap 20 between the flange 10b and the adapter with the insertion guide 5b, after previously inserting the leading end portion of the central conductor 8b into the insertion portion 4b for positioning, by inserting the flange 10b into the adapter with the insertion guide 5b, the axis of the bushing 7b coincides with the axis of the branch tube 2b, and thus the bushing 7b is self-aligned with the branch tube 2b. The insertion is then completed when the lower end surface of the flange 10b is in contact with the upper end surface of the base portion of the adapter with the insertion guide 5b, and the lower end portion 9b of the central conductor 8b is inserted into the insertion portion 4b as far as the insertion completion position (FIG. 2).

Figure 4:
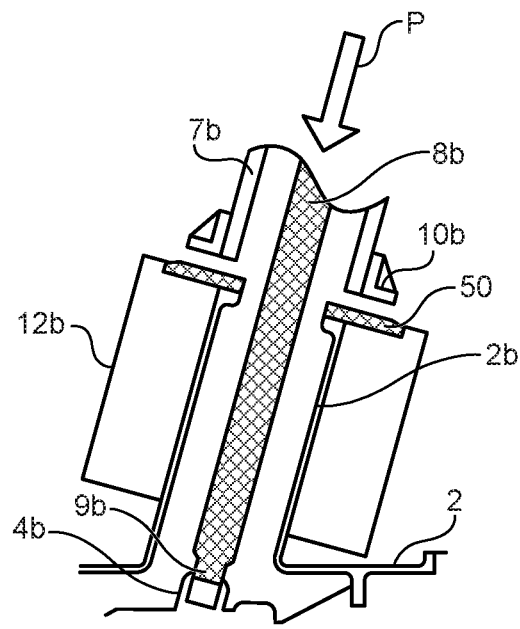
FIG. 4 is a diagram illustrating a conventional attaching structure of a bushing (during insertion).
Figure 5:
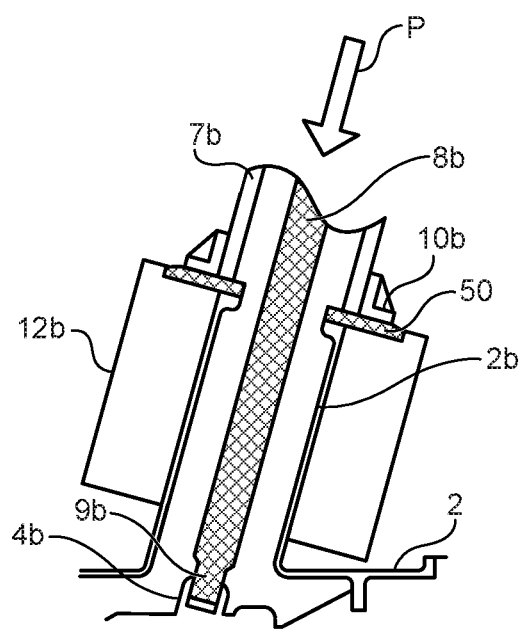
FIG. 5 is a diagram illustrating a conventional attaching structure of the bushing (after the insertion is completed).

FIGS. 4 and 5 illustrate a conventional method for attaching a bushing. FIG. 4 illustrates an attaching structure of a bushing during the insertion, and FIG. 5 illustrates an attaching structure of a bushing when the insertion is completed. In FIGS. 4 and 5, the same constituent elements as those illustrated in FIGS. 1 to 3 are denoted by the same reference numerals.

As illustrated in FIGS. 4 and 5, in the conventional attaching structure of the bushing, the adapter 50 provided at the leading end portion of the branch tube 2b has an annular shape and is not provided with the insertion guide portion 6b as in the present embodiment.

Therefore, when the inclination angle of the bushing 7b deviates from the normal angle, the lower end portion 9b of the central conductor 8b may run over the insertion portion 4b or may be seized during the insertion even though the lower end portion 9b is inserted into the insertion portion 4b, and thus, the workability is very poor.

In contrast, in the present embodiment, the adapter with the insertion guide 5a is provided at the leading end portion of the branch tube 2a, and the adapter with the insertion guide 5b is provided at the leading end portion of the branch tube 2b. Therefore, according to the present embodiment, after the lower ends of the central conductors 8a and 8b are inserted into the insertion portions 4a and 4b, the bushings 7a and 7b are self-aligned with the branch tubes 2a and 2b; therefore, the attachment of the bushings 7a and 7b is easy and thus the assembling workability is improved.

In particular, as in the illustrated example, when the bushings 7a and 7b are inclined, because the attachment is difficult when compared to a case where the bushings 7a and 7b extend perpendicularly to the installation surface, there is a remarkable improvement in assembling workability by applying the present embodiment.

Moreover, in the attaching operation of the bushings 7a and 7b, although the end portion 2c is an inspection opening, because the bushing 7a on the movable side is away from the end portion 2c, the insertion portion 4a is hard to see, and the workability is extremely poor. However, by applying the present embodiment, the workability when attaching the bushing 7a is also improved as in the case of the bushing 7b.

Also, when a polymer porcelain tube is used for the porcelain tubes 11a and 11b, because the aging degradation is expected when compared to the case of using a ceramic porcelain tube, there is a possibility of shortening of the replacement time. However, even in such a case, according to the present embodiment, it is possible to facilitate the replacement operation of the bushings 7a and 7b in the field.

Further, according to the present embodiment, it is possible to prevent an unnecessary load burden from being placed on the components of the arc-extinguishing chamber 3 during assembling, due to a situation in which the lower end portions 9a and 9b of the central conductors 8a and 8b are seized in the insertion portions 4a and 4b.

Although the present embodiment describes the configuration of one phase of a three-phase gas circuit breaker, the same also applies to the configuration of the phase separation type three-phase. In this case, the circuit breaker tanks for three phases are arranged in a direction orthogonal to the respective axes, and the bushings connected to the circuit breaker tanks of both ends in the arrangement direction may be inclined away from each other. That is, in the three-phase gas circuit breaker of the phase separation type, the bushings may be inclined both in the axial direction and in the arrangement direction of the circuit breaker tanks, and in such a case, although the attaching operation of the bushings is generally difficult, by applying the present embodiment, attachment of the bushings is facilitated.

Further, in the present embodiment, although the insertion guide portions 6a and 6b are configured such that they are integral with the base portions of the adapter with the insertion guides 5a and 5b, respectively, the insertion guide portions 6a and 6b may be detachably configured. In this way, the present embodiment is easily achieved for an existing gas circuit breaker.

Further, in the present embodiment, although the insertion guide portions 6a and 6b have a cylindrical shape, they are not limited thereto, and the insertion guide portions 6a and 6b can have any shape as long as they can guide the flanges 10a and 10b. For example, the insertion guide portions 6a and 6b may be disposed at an interval in a circumferential direction of the annular base portions (the base portions of the adapters with the insertion guides 5a and 5b), and may be formed of a plurality of arcuate pieces extending perpendicularly with respect to the end surfaces of the base portions.

INDUSTRIAL APPLICABILITY

As described above, the present invention is useful as a gas circuit breaker including a bushing and a method for attaching the bushing to the gas circuit breaker.

REFERENCE SIGNS LIST 1 gas circuit breaker, 2 circuit breaker tank, 2a, 2b branch tube, 2c end portion, 3 arc-extinguishing chamber, 4a, 4b insertion portion, 5a, 5b adapter with insertion guide, 6a, 6b insertion guide portion, 7a, 7b bushing, 8a, 8b central conductor, 9a, 9b lower end portion, 10a, 10b flange, 11a, 11b porcelain tube, 12a, 12b device current transformer, 15 operating device, 16 frame, 20 gap, 50 adapter.

The invention claimed is:

1. A gas circuit breaker comprising:
an arc-extinguishing chamber that is housed in a circuit breaker tank disposed such that an axis is parallel to an installation surface and that includes an insertion portion for attaching a bushing;
a bushing that includes a porcelain tube and a central conductor, the porcelain tube being connected to a branch tube branched from an upper side surface of the circuit breaker tank and including a flange at a lower end portion, the central conductor penetrating through an inside of the porcelain tube, extending a constant distance from a lower end of the porcelain tube, and having a lower end portion inserted through the branch tube into the insertion portion; and
an adapter with an insertion guide that is provided at a leading end portion of the branch tube for connection between the porcelain tube and the branch tube, and that includes a base portion abutting against a lower end surface of the flange and an insertion guide portion erected on an upper end surface of the base portion and extending in an axial direction of the branch tube, wherein
after a lower end of the central conductor is inserted into the insertion portion, the flange is inserted into the adapter with the insertion guide in accordance with guidance of the insertion guide portion such that the bushing and the branch tube are self-aligned with each other, and
a height of the insertion guide portion is set such that, at least when the lower end of the central conductor coincides with an upper end of the insertion portion in the axial direction, a gap is kept between an upper end of the insertion guide portion and a lower end of the flange in the axial direction.

2. The gas circuit breaker according to claim 1, wherein the flange has an annular shape, and
the insertion guide portion has a cylindrical shape.

3. The gas circuit breaker according to claim 1, wherein the insertion guide portion is detachably provided at a base portion of the adapter with the insertion guide.

4. The gas circuit breaker according to claim 1, wherein the bushing is inclined with respect to the installation surface.

5. The gas circuit breaker according to claim 1, wherein the porcelain tube is a polymer porcelain tube.

6. A method for attaching a bushing to a gas circuit breaker comprising an arc-extinguishing chamber, a bushing, and an adapter with an insertion guide, the arc-extinguishing chamber being housed in a circuit breaker tank disposed such that an axis is parallel to an installation surface and including an insertion portion for attaching a bushing, the bushing including a porcelain tube and a central conductor, the porcelain tube being connected to a branch tube branched from an upper side surface of the circuit breaker tank and including a flange at a lower end portion, the central conductor penetrating through an inside of the porcelain tube, extending a constant distance from a lower end of the porcelain tube, and having a lower end portion inserted through the branch tube into the insertion portion, the adapter with the insertion guide being provided at a leading end portion of the branch tube and including a base portion abutting against a lower end surface of the flange and an insertion guide portion erected on an upper end surface of the base portion and extending in an axial direction of the branch tube,
the method comprising:
a step of inserting a lower end of the central conductor through the branch tube into the insertion portion such that a gap is provided in the axial direction between the flange and the insertion guide portion;
a step of inserting a lower end portion of the central conductor into the insertion portion in a state where the bushing and the branch tube are self-aligned with each other by inserting the flange into the adapter with the insertion guide in accordance with guidance of the insertion guide portion; and
setting a height of the insertion guide portion such that, at least when the lower end portion of the central conductor coincides with an upper end of the insertion portion in the axial direction, a gap is kept between an upper end of the insertion guide portion and a lower end of the flange in the axial direction.

* * * * *